United States Patent [19]

Barsukov et al.

[11] 4,277,546
[45] Jul. 7, 1981

[54] SEALED LEAD-ACID STORAGE BATTERY

[76] Inventors: Vyacheslav Z. Barsukov, ulitsa Gogolya, 6, kv.34; Sergei A. Dunovsky, prospekt Gagarina, 92, kv. 16; Lenik N. Sagoian, ulitsa Chernyshevskogo, 15, kv. 44, all of Dnepropetrovsk; Anatoly I. Trepalin, ulitsa Novoalexeevskaya, 11, kv. 58, Moscow; Igor A. Aguf, prospekt Metallistov, 18, kv. 79, Leningrad; Valentina S. Smolkova, Revprospekt,32/2, kv. 79, Podolsk Moskovskoi oblasti, all of U.S.S.R.

[21] Appl. No.: 115,372
[22] Filed: Jan. 25, 1980

[30] Foreign Application Priority Data

May 23, 1979 [SU] U.S.S.R. .............................. 2761312

[51] Int. Cl.³ ........................................ H01M 10/34
[52] U.S. Cl. .................................................. 429/59
[58] Field of Search ...................... 429/57, 58, 59, 60, 429/213

[56] References Cited

U.S. PATENT DOCUMENTS 2,104,973  1/1938  Dassler .................................. 429/59
3,462,303  8/1969  Reber .................................... 429/58

Primary Examiner—Donald L. Walton
Attorney, Agent, or Firm—Steinberg and Raskin

[57] ABSTRACT

A sealed lead-acid storage battery of the Invention comprises a containers accommodating a lead dioxide cathode, a lead anode and an additional gas absorbing electrode formed from a mixture composed of an electrically conductive carbonaceous material and of a slightly water soluble quinoid compound having a low oxidation-reduction potential.

7 Claims, 4 Drawing Figures

SEALED LEAD-ACID STORAGE BATTERY

BACKGROUND OF THE INVENTION

Field of the Invention

The present invention relates to devices for converting chemical energy into electric energy. More particularly, the invention is concerned with sealed lead-acid storage batteries. The invention may be used as a self-contained source of electric energy in radioelectronics, transport means, etc. The invention is of particular advantage in the field of radioelectronics, especially when great temperature variations and low temperatures are involved.

With the development of engineering the demand for self-contained sources of electric energy in particular, for storage batteries increases. If at the beginning of this century the ship building and automobile construction industries were the main consumers of storage batteries, nowadays it is difficult to find a field of engineering where said devices are not employed. Storage batteries which are most extensively used at present in radioelectronics, communications engineering, aviation and medicine are alkaline batteries since they can be made hermetically sealed. But the alkaline storage batteries, as compared to the lead-acid batteries, have considerable disadvantages: a high cost and a low reliability in operation at high densities of currents (e.g. when used for starting engines) and at low ambient temperatures. The main disadvantage of the lead-acid storage batteries, which are cheaper as compared to the alkaline ones, is that up to now they could not be made hermetically sealed.

This disadvantage results from the fact that the lead-acid stoage batteries known in the art do not ensure a full absorption of the gases (oxygen and hydrogen) which evolve during their charging.

Non-hermetic storage batteries are rather inconvenient in operation because they may not be turned over, and the evolving acid vapours affect the neighbouring devices. Moreover, the electrolyte must be refilled and corrected. In radioelectronic equipment this type of storage batteries cannot be used at all.

In the known lead-acid storage battery described in French Pat. No. 2,290,048, gas evolution in the processes of charging is reduced by making the negative electrodes with a higher capacitance. In this case charging is carried out in stages and takes too much time, which complicates its operation. Moreover, this design does not fully eliminate gas evolution during the charging process, which is why a safety valve must be fitted in its upper wall. The need to use the safety valve and stages charging considerably complicates the storage battery design and its service, thus limiting the field of its application.

As compared to the above-described storage battery, gas evolution which occurs during the process of charging is considerably decreased in a storage battery (cf. Japanese Pat. No. 7038, N. Cl. 57, p. 145, 1969), wherein apart from the container, anode and cathode, there to provided an additional gas absorbing electrode. This gas absorbing electrode is made of a porous carbonaceous material soaked with the salts of such metals as platinum, palladium or ruthenium which are used as catalysts for the recombination reaction of the evolving gases, resulting in the formation of water. The auxiliary gas absorbing electrode is immersed in the electrolyte or placed on its surface and is positioned between the storage battery cathode and anode. The electrolyte is a mixture of sulphuric and phosphoric acids into which a thickening agent may be introduced such as, for example, liquid glass ($SiO_2$) or pection. Charging of this storage battery is also carried out in two stages and takes dozens of hours. In the storage battery described above there is no gas evolution only in the initial stage of its operation. In the course of time the gas absorbing electrode catalyst becomes aged, its activity lowers, and the gas evolving during charging of the storage battery is not fully absorbed. Therefore this battery is also provided with a safety valve, which limits its application. In the case of using a liquid electrolyte the storage battery must be positioned with the valve upwards. In the case of a solidified electrolyte the storage battery internal resistance is higher and the storage batteries with solidified electrolytes do not operate sufficiently good when the ambient temperature greatly varies or is low. Moreover, the additional gas absorbing electrodes contain salts of precious metals as catalysts, which considerably increases the storage battery cost.

SUMMARY OF THE INVENTION

The principal object of this invention is to increase a reliability of a sealed lead-acid storage battery, with the battery container being completely sealed during the whole term of its service.

Another object of the present invention is to improve specific electrical and operating characteristics of the sealed lead-acid storage battery.

Still another object of this invention is to reduce the cost of the sealed lead-acid storage battery.

These and other objects of the invention are accomplished in a sealed lead-acid storage battery comprising a container accommodating a lead dioxide cathode, a lead anode, and an additional gas absorbing electrode, wherein according to the invention the additional gas absorbing electrode is manufactured from a material which is a slightly soluble quinoid compound having a low oxidation-reduction potential.

Such arrangement makes it possible to manufacture a hermetic lead-acid storage battery possessing a high reliability in operation, with the battery container being hermetically sealed during the whole term of its service without increasing the durability thereof and worsening the storage battery electrical and operating characteristics. The high reliability of its operation is attained due to the fact that the additional gas absorbing electrode is manufactured from a material which is a slightly soluble quinoid compound having a low oxidation-reduction potential. Such electrode has a high ability to absorb oxygen evolving on the cathode in the process of charging the storage battery. It does not age in the course of its service, allows the storage battery to be charged quicker than with the aid of the gas absorbing electrode described in Japanese Pat. No. 44-7038, and is considerably cheaper than the prior art electrode. To prevent gas evolution on the storage battery anode, the latter should have an extra capacitance.

The storage battery of the invention makes it possible to get rid of the safety valve devices, which will considerably widen the storage battery field of application.

It is expedient that the additional gas absorbing electrode be made of a mixture composed of a slightly soluble quinoid compound having a low oxidation-reduction potential and of an electrically conductive carbonaceous material. Hydroanthraquinone is the most available and cheapest quionoid compound having a low oxidation-reduction potential.

The additional gas absorbing electrode should be made of a mixture composed of the electrically conductive carbonaceous material and of hydroanthraquinone with the following ratio of the above components, in weight percent;

carbonaceous material ... 20-80
hydroanthraquinone ... 80-20

Additional gas absorbing electrode containing 80% hydroanthraquinone and 20% carbonaceous material has high capacitance characteristics and features a low rate of gas absorption. Such an electrode can be charged without gas formation quicker than that known in the art (cf. Japanese No. 44-7038). A decrease of the carbonaceous material content in the auxiliary gas absorbing electrode drastically impairs its electrical and operating characteristics in so far as its specific electrical conductivity will considerably increase.

An additional gas absorbing electrode containing 80% carbonaceous material and 20% hydroanthraquinone has the greatest gas-absorbing ability as compared to the electrodes with 20-79% carbonaceous material content. But due to a large amount of the carbonaceous material its specific electrical characteristics will be somewhat lower.

Storage batteries with a gas absorbing electrodes containing 80% carbonaceous material are characterized by a high rate of charging.

It is most expedient to make storage batteries with a gas absorbing electrode containing 40-60% carbonaceous material.

In order to increase the additional electrode gas-absorbing ability, it is expedient that it be made of a mixture composed of the electrically conductive carbonaceous material and of anthraquinone derivative with electron-donating substituents with the following ratio of the above components, in weight percent:

carbonaceous material ... 20-80
anthraquinone derivative ... 80-20

The presence of the electron-donating substituents in the anthraquinone ring decreases the equilibrium oxidation-reduction potential of the additional electrode due to which its gas-absorbing ability increases. A storage battery with an additional gas absorbing electrode containing 80% anthraquinone derivative and 20% electrically conductive carbonaceous material requires more time for charging as compared to the storage battery whose gas absorbing electrode contains less than 80% anthraquinone derivative and more than 20% electrically conductive carbonaceous material. An additional gas absorbing electrode containing 80% electrically conductive carbonaceous material and 20% anthraquinone derivative features the highest rate of gas absorption. But the specific electrical characteristics of such an electrode are lower.

To cut down the cost and overall dimensions of the sealed lead-acid storage battery, it is expedient that the additional gas absorbing electrode be formed integrally with the anode in the form of a combined electrode.

A normal functioning of the combined electrode as the anode and gas absorbing electrode will also be ensured even if only its terminals are coated with lead.

These and other objects and advantages of the invention will appear from the following description in which the preferred embodiment is set forth in detail in conjunction with the accompanying drawings.

It should be noted that the accompanying drawings are shown diagrammatically for illustrative purposes of an embodiment of the present invention without any limitations as to the storage battery dimensions, relation of the dimensions of its parts etc.

DETAILED DESCRIPTION OF THE INVENTION

Now embodiments of the invention will be described with reference to the accompanying drawings.

Figure 1:
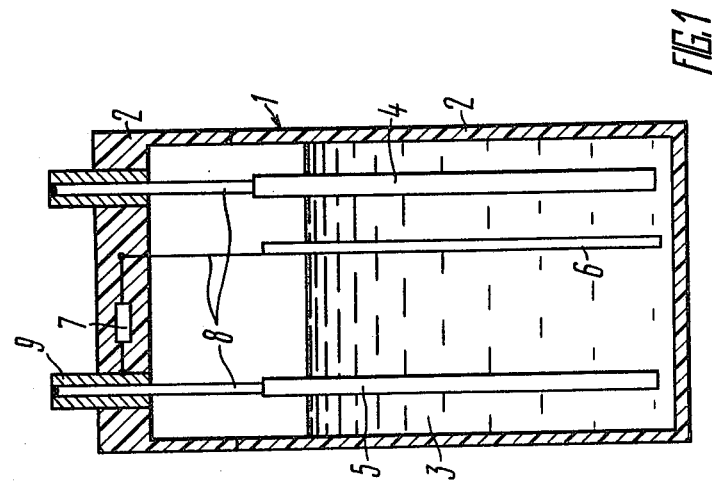
FIG. 1 is a diagrammatic representation of the elevation view of the lead-acid storage battery, according to the invention.

A sealed lead-acid storage battery includes (FIG. 1) a container 1 having walls 2 which define a hollow 3. The container 1 is expediently made of polystyrene or polyethylene. Hexanormal sulphuric acid (6N $H_2SO_4$) is used as electrolyte. A lead dioxide cathode 4, a lead anode 5, and an auxiliary gas absorbing electrode 6 are secured to the upper wall 2 of the container 1. The said electrodes 4,5,6 are positioned within the container 3 in the manner shown in FIG. 1, i.e. the additional gas absorbing electrode 6 is disposed closer to the cathode 4 than to the anode 5, and is electrically connected through a resistor 7 with the anode 5. The additional gas absorbing electrode 6 may be variously otherwise positioned, for example, horizontally on the electrolyte surface between the anode 5 and the cathode 4. The electrodes 4, 5, 6 are conventially surrounded by separators (not shown). The resistor 7 is selected so that the potential of the additional gas absorbing electrode 6 of the charged storage battery is +0.05 (±0.01) V of the standard hydrogen electrode, which is necessary for the normal operation of the storage battery. The cathode 4 and the anode 5 are manufactured by methods the known in the art. The additional gas absorbing electrode 6 is manufactured from the mixture composed of an electrically conductive carbonaceous material and of a barely water soluble quinoid compound having a low oxidation-reduction potential by moulding this mixture at a pressure of the order of 250 kg/cm². Terminals 8 are made of a graphite material and terminal taps 9 are made of lead. Graphite, acetylene black, activated carbon or compounds thereof may be used as the electrically conductive carbonaceous materials.

Figure 2:
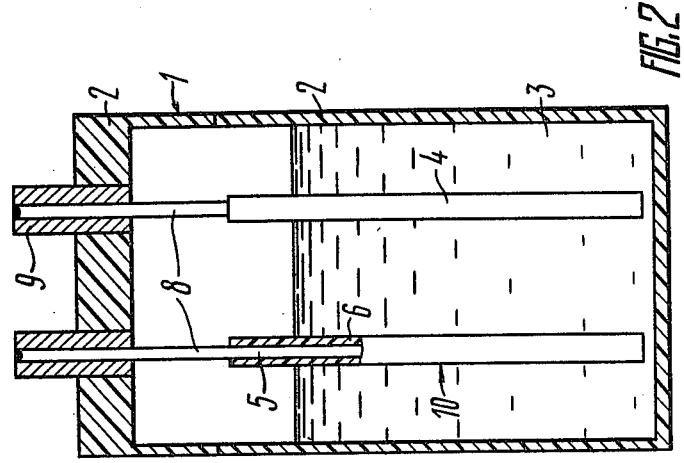
FIG. 2 is a diagrammatic representation of the elevation view of the modified hermetic lead-acid storage battery with a combined electrode.

FIG. 2 represents an elevation view of a modification of the sealed lead-acid storage battery with a combined electrode 10. The combined electrode 10 incorporates the anode 5 with the additional gas absorbing electrode 6. FIG. 2 shows another modification, wherein the lead anode 5 is coated with a layer of the substance forming the gas absorbing electrode 6. It has been established that a combined electrode 10 wherein only the terminal taps 9 are coated with lead also operates normally (not shown in the drawing). With the electrical characteristics being equal *a*storage battery provided with a combined electrode 10 has smaller dimensions than those having separate anode 5 and electrode 6.

Figure 3:
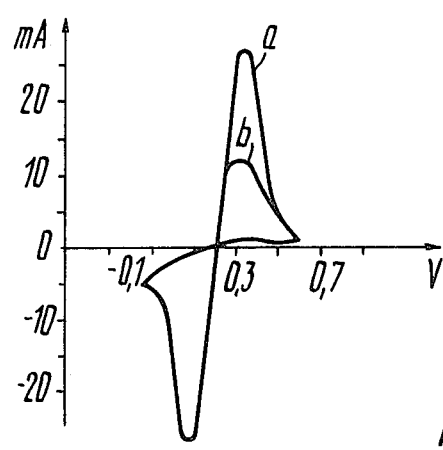
FIG. 3 illustrates cyclic volt-ampere characteristics of the modified combined electrode.

FIG. 3 illustrates cycle volt-ampere characteristics of one modification of the combined electrode. The combined electrode is made from a mixture composed of graphite (60%) and hydroanthraquinone (40%). The terminals 8 are coated with lead. The electrode measures 35×30×2 mm. It was placed into a trinormal solution of sulphuric acid. The electrode potential was plotted on the abscissa measured relative to the standard hydrogen electrode, the electrode operating current value was plotted on the ordinate. Curve "a" obtained by continuous blowing of nitrogen through a sulphuric acid solution demonstrates a practically ideal reversibility of the main electrochemical reaction progress. After reading the cathode characteristic, the bubbling of nitrogen was ceased and after a two hour's holding of the combined electrode in the same solution, there was obtained another volt-ampere characteristic (curve "b"). In this case the area confined by the curve "b" proved smaller than that confined by the curve "a", which is explained by the fact that along with the main current-generating process there takes place concurrent reaction of a chemical oxidation of hydroanthraquinone in accordance with the following equation:

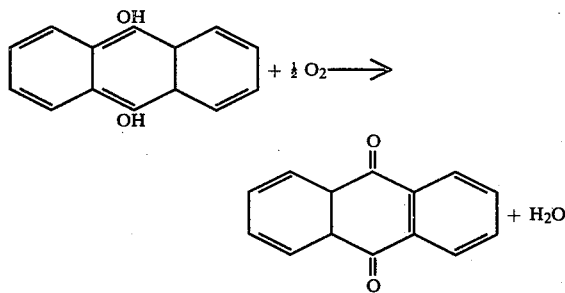

Holding of the electrode for 24 hours in an opened container filled with the sulphuric acid solution without blowing an inert gas therethrough leads to practically full oxidation of the said electrode, which confirms that hydroanthraquinone is vigourosly oxidized even in the presence of a relatively small amount of oxygen which is contained in the acid solution.

Thus, hydroanthraquinone, its derivatives and other slightly soluble quinoide compounds with a low oxidation-reduction potential (for example, hydronaphtoquinones, whose rate of oxidation is nevertheless considerably lower due to higher values of the oxidation-reduction potential: $\phi \geq 0.2 + 0.3$ V), being ideally reversible and available materials, may serve as active components of the additional gas absorbing electrode 6 (FIG. 1) and of the combined electrode 10 (FIG. 2).

Figure 4:
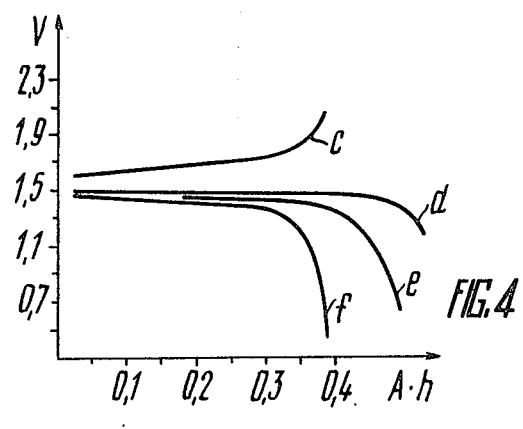
FIG. 4 illustrates charging-discharging characteristics of the modified hermetic lead-acid storage battery with a combined electrode.

FIG. 4 illustrates charging-discharging characteristics of still another modification of the sealed lead-acid storage battery having a combined electrode made from a mixture composed of graphite (60%) and hydroanthraquinone (40%). A solution of hexanormal sulphuric acid is used as an electrolyte. Curve "c" is obtained for a 4 hour's galvanostatic charging of the storage battery, and curves "d", "e", "f" are obtained for 20, 10 and 4 hour operation respectively. These curves illustrate a good efficiency of the storage battery for different operating cycles.

Now the invention will be described in terms of specific embodiments of the sealed lead-acid storage battery.

In all embodiments below, the sealed lead-acid storage battery and its electrodes have the following dimensions: container—43×44×28.5 mm; thickness of walls—2 mm; electrodes—35×40 mm. A solution of hexanormal sulphuric acid is used as an electrolyte.

EXAMPLE 1

The storage battery includes a container 1 manufactured from polystyrene, a lead dioxide cathode 4, a lead anode 5 and an additional gas absorbing electrode 5 containing 20% graphite and 80% hydroanthraquinone. The capacitance is of the order of 0.5 A when discharging to 1 V for 10 hours. Specific power of the storage battery is of the order of 20 (W.h/kg). The storage battery is expediently charged galvanostatically for 10–15 hours. In this case pressure inside the storage battery does not exceed 0.2 excess atmospheres. In a 4 hour charging the pressure rises to 0.9 excess atm.

EXAMPLE 2

The storage battery includes a container 1, a cathode 4 and an anode 5 as in Example 1. The additional gas absorbing electrode 6 contains 80% activated carbon and 20% hydroanthraquinone. The storage battery can be charged in 3–4 hours. In this case gauge pressure does not exceed 0.3 atm. Specific power of the storage battery is of the order of 20 (W.h/kg).

EXAMPLE 3

The storage battery includes a container 1, a cathode 4 and an anode 5 as in Example 1. The additional gas absorbing electrode 6 contains 40% hydroanthraquinone and a 60% mixture composed of acetylene black and activated carbon. The storage battery can be charged in 5–8 hours. In this case gauge pressure inside the storage battery does not exceed 0.6 atm. Specific power of the storage battery is of the order of 20 (W.h/kg).

EXAMPLE 4 (negative)

The storage battery includes a container 1, a cathode 4 and an anode 5 as in Example 1. The additional gas absorbing electrode 6 contains 10% activated carbon and 90% hydroanthraquinone. In this case the storage battery is inoperative because even with long charging (10–15 hours) gauge pressure inside the storage battery is greater than 1 atm, i.e. it exceeds the permissible value.

EXAMPLE 5 (negative)

The storage battery includes a container 1, a cathode 4 and an anode 5 as in Example 1. The additional gas absorbing electrode 6 contains 90% activated carbon and 10% hydroanthraquinone. The storage battery is inoperative because due to a small amount of hydroanthraquinone the gas is not completely absorbed by the additional gas absorbing electrode 6, and gauge pressure inside the storage battery is greater than 1 atm, i.e. it exceeds the permissible value.

The equilibrium potential of the gas absorbing electrode 6 in Examples 1–5 is approximately +0.15 V of the standard hydrogen electrode.

EXAMPLE 6

The storage battery includes a container 1, a cathode 4 and an anode 5 as in Example 1. The additional gas absorbing electrode 6 contains 80% β-methylanthraquinone (I - methylanthraquinone) and 20% graphite. Specific power of the storage battery is of the order of 20

(W.h/kg). The storage battery is charged in 10 hours. The gauge pressure inside the storage battery does not exceed 0.2 atm.

EXAMPLE 7

The storage battery includes a container 1, a cathode 4 and an anode 5 as in Example 1. The additional gas absorbing electrode 6 contains 20% β-methylanthraquinone and 80% activated carbon. The storage battery is charged for 3–4 hours. The excess pressure inside the storage battery does not exceed 0.25 atm. Specific power of the storage battery is of the order of 20 (W.h/kg).

EXAMPLE 8

The storage battery includes a container 1, a cathode 4 and an anode 5 as in Example 1. The additional gas absorbing electrode 6 contains 40% β-methylanthraquinone and 60% graphite. The storage battery is charged for 5 hours. The excess pressure does not exceed 0.3 atm. Specific power of the storage battery is of the order of 20 (W.h/kg).

In Examples 6,7,8 the equilibrium potential of the auxiliary electrode 6 is approximately +0.07 V of the standard hydrogen electrode.

EXAMPLE 9

The storage battery includes a container 1, a cathode 4 and an anode 5, as in Example 1. The additional gas absorbing electrode 6 contains 80% 1,4-dimethylanthraquinone and 20% graphite. The storage battery is charged for 5 hours. Gauge pressure does not exceed 0.3 atm. Specific power of the storage battery is of the order of 20 (W.h/kg).

EXAMPLE 10

The storage battery includes a container 1, a cathode 4 and an anode 5, as in Example 1. The additional gas absorbing electrode 6 contains 20% 1,4-dimethylanthraquinone and 80% graphite. The storage battery is charged for 5 hours. Gauge pressure does not exceed 0.28 atm. Specific power of the storage battery is of the order of 20 (W.h/kg).

EXAMPLE 11

The storage battery includes a container 1, a cathode 4 and an anode 5, as in Example 1. The additional gas absorbing electrode 6 contains 40% 1,4-dimethylanthraquinone and 80% graphite. The storage battery is charged for 5 hours. Gauge pressure does not exceed 0.28 atm. Specific power of the storage battery is of the order of 20 (W.h/kg).

In examples 9, 10, 11 the quilibrium potential of the gas absorbing electrode 6 is approximately equal to zero of the standard hydrogen electrode.

EXAMPLE 12

The storage battery includes a container 1, a cathode 4 and an anode 5 as in Example 1. The additional gas absorbing electrode 6 contains 80% 1,2,4-trimethylanthraquinone and 20% graphite. The storage battery is charged for 5 hours. Gauge pressure does not exceed 0.25 atm. Specific power of the storage battery is of the order of 20 (W.h/kg).

EXAMPLE 13

The storage battery includes a container 1, a cathode 4 and an anode 5 as in Example 1. The additional gas absorbing electrode 6 contains 20% 1,2,4-trimethylanthraquinone and 80% graphite. The storage battery is charged for 5 hours. Gauge pressure does not exceed 0.23 atm. The storage battery specific power is of the order of 20 (W.h/kg).

EXAMPLE 14

The storage battery includes a container 1, a cathode 4, and an anode 5, as in Example 1. The additional gas absorbing electrode 6 contains 40% 1,2,4-trimethylanthraquinone and 60% graphite. The storage battery is charged for 5 hours. Gauge pressure does not exceed 0.25 atm. Specific power of the storage battery is of the order of 20 (W.h/kg).

In examples 12,13,14 the equilibrium potential of the gas absorbing electrode 6 is approximately −0.06 V of the standard hydrogen electrode.

EXAMPLE 15

The storage battery includes a container 1, a cathode 4 and an anode 5, as in Example 1. An additional gas absorbing electrode 6 contains 80% 1,2,4,7-tetramethylanthraquinone and a 20% mixture of graphite with activated carbon. The storage battery is charged for 10 hours. Gauge pressure does not exceed 0.15 atm. The storage battery specific power is of the order of 20 (W.h/kg).

EXAMPLE 16

The storage battery includes a container 1, a cathode 4 and an anode 5, as in Example 1. The additional gas absorbing electrode 6 contains 20% 1,2,4,7-tetramethylanthraquinone and an 80% mixture of acetylene black with activated carbon. The storage battery is charged for 3–4 hours. Gauge pressure does not exceed 0.2 atm. The storage battery specific power is of the order of 20 (W.h/kg).

EXAMPLE 17

The storage battery includes a container 1, a cathode 4 and an anode 5, as in Example 1. The additional gas absorbing electrode 6 contains 40% 1,2,4,7-tetramethylanthraquinone and 60% graphite. The storage battery is charged for 5 hours. Gauge pressure does not exceed 0.25 atm. The storage battery specific power is of the order of 20 (W.h/kg).

In Examples 15,16,17 the equilibrium potential of the gas absorbing electrode 6 is approximately −0.12 V of the standardard hydrogen electrode.

EXAMPLE 18

The storage battery includes a container 1, a cathode 4 and an anode 5, as in Example 1. An additional gas absorbing electrode 6 contains 80% 1,2,4,7,8-pentamethylanthraquinone and 20% graphite. The storage battery is charged for 10 hours. Gauge pressure does not exceed 0.12 atm. The storage battery specific energy is of the order of 20 (W.h/kg).

EXAMPLE 19

The storage battery includes a container 1, a cathode 4 and an anode 5 identical to those described in Example 1. An additional gas absorbing electrode 6 contains 20% 1,2,4,7,8 pentamethylanthraquinone and 80% graphite. The storage battery is charged for 5 hours. Gauge pressure does not exceed 0.25 atm. The storage battery specific power is of the order of 20 (W.h/kg).

EXAMPLE 20

The storage battery includes a container 1, a cathode 4, and an anode 5, as in Example 1. The additional gas absorbing electrode 6 contains 40% 1,2,4,7,8-pentamenthylanthraquinone and 60% graphite. The storage battery is charged for 5 hours. Gauge pressure does not exceed 0.2 atm. The storage battery specific power is of the order of 20 (W.h/kg).

In Examples 18,19,20 the equilibrium potential of the gas absorbing electrode 6 is approximately −0.18 V by the standard hydrogen electrode.

EXAMPLE 21

The storage battery includes a container 1, a cathode 4 and an anode 5, as in Example 1. The additional gas absorbing electrode 6 contains 80% 1,2,4,6,7,8-hexamethylanthraquinone and 20% graphite. The storage battery is charged for 10 hours. Gauge pressure does not exceed 0.1 atm. The storage battery specific power is of the order of 20 (W.h/kg).

EXAMPLE 22

The storage battery includes a container 1, a cathode 4 and an anode 5, as in Example 1, The additional gas absorbing electrode 6 contains 20% 1,2,4,6,7,8-hexamethylanthraquinone and 80% graphite. The battery is charged for 5 hours. Gauge pressure does not exceed 0.2 atm. The storage battery specific power is of the order of 20 (W.h/kg).

EXAMPLE 23

The storage battery includes a container 1, a cathode 4 and an anode 5, as in Example 1. The additional gas absorbing electrode 6 contains 40% 1,2,4,6,7,8-hexamethylanthraquinone and 60% graphite. The storage battery is charged for 5 hours. Gauge pressure does not exceed 0.23 atm. The storage battery specific power is of the order of 20 (W.h/kg).

In Examples 21, 22, 23 the equilibrium potential of the gas absorbing electrode 6 is approximately −0.23 V of the standard hydrogen electrode.

EXAMPLE 24

The storage battery includes a container 1, a cathode 4 and an anode 5, as in Example 1. The additional gas absorbing electrode 6 contains 80% 1,2,3,4,6,7,8-heptamethylanthraquinone and 20% graphite. The storage battery is charged for 10 hours. Gauge pressure does not exceed 0.15 atm. The storage battery specific power is of the order of 20 (W.h/kg).

EXAMPLE 25

The storage battery includes a container 1, a cathode 4 and an anode 5, as in Example 1. The additional gas absorbing electrode 6 contains 20% 1,2,3,4,6,7,8-heptamethylanthraquinone and 80% graphite. The storage battery is charged for 5 hours. Gauge pressure does not exceed 0.18 atm. The storage battery specific power is of the order of 20 (W.h/kg).

EXAMPLE 26

The storage battery includes a container 1, a cathode 4 and an anode 5, as in Example 1. The additional gas absorbing electrode 6 contains 40% 1,2,3,4,6,7,8-heptamethylanthraquinone and 60% graphite. The storage battery is charged for 5 hours. Gauge pressure does not exceed 0.20 atm. The storage battery specific power is of the order of 20 (W.h/kg).

In Examples 24,25,26 the equilibrium potential of the additional gas absorbing electrode 6 is approximately −0.28 V of the standard hydrogen electrode.

EXAMPLE 27

The storage battery includes a container 1, a cathode 4 and an anode 5, as in Example 1. The additional gas absorbing electrode 6 contains 80% 1,2,3,4,5,6,7,8-octamethylanthraquinone and a 20% mixture of graphite with acetylene black. The storage battery is charged for 10 hours. Gauge pressure does not exceed 0.1 atm. The storage battery specific power is of the order of 20 (W.h/kg).

EXAMPLE 28

The storage battery includes a container 1, a cathode 4 and an anode 5, as in Example 1. The additional gas absorbing electrode 6 contains 20% 1,2,3,4,5,6,7,8-octamethylanthraquinone and a 20% compound of graphite with acetylene black. The storage battery is charged for 3-4 hours. Gauge pressure does not exceed 0.15 atm. The storage battery specific power is of the order of 20 (W.h/kg).

EXAMPLE 29

The storage battery includes a container 1, a cathode 4 and an anode 5, as in Example 1. The additional gas absorbing electrode 6 contains 40% 1,2,3,4,5,6,7,8-octamethylanthraquinone and 60% graphite. The storage battery is charged for 5 hours. Gauge pressure does not exceed 0.1 atm. A storage battery specific power is of the order of 20 (W.h/kg).

In Examples 12,13,14 the equilibrium potential of the additional gas absorbing electrode 6 is approximately −0.31 V of the standard hydrogen electrode.

The additional gas absorbing electrode 6 can be made of a mixture composed of an electrically conductive carbonaceous material and of any anthraquinone derivative with electron-donating substituents. The parameters of storage batteries wherein other anthraquinone derivatives are used are close to those described in Examples 6–29. In Examples 30–48 given in Table 1 are illustrated the equilibrium potentials of the gas absorbing electrode 6 manufactured from a mixture composed of an electrically conductive carbonaceous material and some other possible derivatives of anthraquinone.

TABLE 1

| Nos of examples | Type of substituent | Qnty of substituent groups in anthraquinone ring | Equilibrium potential of the additional gas absorbing electrode, in V |
|---|---|---|---|
| 30 | —OH | 1 | +0.05 |
| 31 | —OH | 2 | −0.01 |
| 32 | —OH | 3 | −0.08 |
| 33 | —OH | 4 | −0.15 |
| 34 | —OH | 5 | −0.22 |
| 35 | —OH | 6 | −0.29 |
| 36 | —OCH$_3$ | 1 | +0.075 |
| 37 | —OCH$_3$ | 2 | −0.005 |
| 38 | —OCH$_3$ | 3 | −0.075 |
| 39 | —OCH$_3$ | 4 | −0.14 |
| 40 | —OCH$_3$ | 5 | −0.21 |
| 41 | —OCH$_3$ | 6 | −0.28 |
| 42 | —OCH$_3$ | 7 | −0.31 |
| 43 | —OC$_2$H$_5$ | 1 | +0.07 |
| 44 | —OC$_2$H$_5$ | 2 | 0.00 |
| 45 | —OC$_2$H$_5$ | 3 | −0.07 |
| 46 | —OC$_2$H$_5$ | 4 | −0.13 |

TABLE 1-continued

| Nos of examples | Type of substituent | Qnty of substituent groups in anthraquinone ring | Equilibrium potential of the additional gas absorbing electrode, in V |
|---|---|---|---|
| 47 | —OC$_2$H$_5$ | 5 | −0.20 |
| 48 | —OC$_2$H$_5$ | 6 | −0.26 |

EXAMPLE 49

The sealed lead-acid storage battery includes a container 1 made of polystyrene, and a lead dioxide cathode 4. The additional gas absorbing electrode 6 is formed integrally with an anode 5 in the form of a combined electrode 10. The combined electrode 10 is manufactured by coating a lead current-carrying base with a mixture of graphite and hydroanthraquinone under a pressure of 250–350 kg/cm$^2$ (40% hydroanthraquinone and 60% graphite). The storage battery e.m.f. is approximately equal to 1.6 V, its specific power is of the order of 21 (W.h/kg). The storage battery is charged for 4–5 hours. Gauge pressure does not exceed 0.3 atm. The equilibrium potential of the additional gas absorbing electrode is +0.15 V of the standard hydrogen electrode.

EXAMPLE 50

The storage battery is in general similar to that described in Example 49. The combined electrode 10 is manufactured by coating a lead core with a mixture composed of graphite and 1,2,4,7-tetramethylanthraquinone, coating is effected under a pressure of 250–350 kg/cm$^2$ (60% graphite and 40% 1,2,4,7-tetramethylanthraquinone). The storage battery e.m.f. is approximately equal to 1.85 V, its specific power is of the order of 23 (W.h/kg). The storage battery is charged for 4–5 hours. Gauge pressure does not exceed 0.2 atm.

EXAMPLE 51

The storage battery is in general similar to that described in Example 50. Graphite is the current-carrying base of the combined electrode 10. The terminal 9 of the electrode 10 is coated with lead. The storage battery e.m.f is approximately equal to 1.85 V, its specific power is of the order of 25 (W.h/kg). The storage battery is charged for 4–5 hours. Gauge pressure inside the storage battery does not exceed 0.3 atm.

The mechanical strength of the additional electrode 6 and the combined electrode 10 may be improved by adding to their composition such binders as polyethylene, polystyrene, fluoroplastic or vinyl plastic.

The sealed lead-acid storage battery described above features a high reliability in operation, with the storage battery container being completely hermetically sealed during the whole term of its service and without increasing the mechanical strength of the container and worsening the storage battery electrical and operating characteristics.

A hermetic seal of the storage battery and elimination of valves makes it possible to dispose the storage battery in the immediate vicinity of the equipment and in any position, which considerably widens the field of its application. The storage battery of the invention can be employed in aviation and space engineering, on motor cars and water transport, in radioelectronic and medical equipment. The storage battery may operate at a temperature up to minus 50° C.

The elimination of the necessity to control and refill the electrolyte, and rapid charging make the storage battery of the invention convenient in operation.

The storage battery of the invention differs from the sealed lead-acid storage batteries known in the art in that it costs less because no expensive materials are required for its manufacture.

It is to be understood that the form of this invention, herewith shown and described, is to be taken as a preferred embodiment, and that various changes in the shape, size and arrangement of parts may be resorted to, without departing from the spirit of the invention, or the scope of the claims below.

What we claim is:

1. A hermetically sealed lead-acid storage battery which evolves gas during charging, said battery comprising a hermetically sealed container, a lead dioxide cathode located in said container, a lead anode located in said container, a gas absorbing electrode located in said container, said gas absorbing electrode consisting essentially of 20–80% by weight of an electrically conductive carbonaceous material and 80–20% by weight of a slightly water soluble quinoid compound having a low oxidation potential, and a liquid acid electrolyte located in said container and partially filling the same so as to define a gas space in said container, said cathode, anode and gas absorbing electrode being in contact with the electrolyte and with the gas space, whereby upon charging of the battery gas formed in the container is absorbed by said gas absorbing electrode.

2. Battery according to claim 7 wherein said quinoid compound is an anthraquinone derivative.

3. Battery according to claim 8 wherein said anthraquinone derivative is hydroanthraquinone.

4. Battery according to claim 1 wherein said quinoid derivative is an anthraquinone substituted by at least one substituent selected from the group consisting of hydroxy, methyl, oxymethyl and oxyethyl.

5. Battery according to claim 1 wherein said carbonaceous material is in an amount of 40–60% by weight and said quinoid derivative is in an amount of 60–40% by weight.

6. Battery according to claim 1 wherein said gas absorbing electrode is integral with said anode to form a combined anode and gas absorbing electrode.

7. Battery according to claim 6 wherein said combined electrode is formed with a terminal which contains lead.

* * * * *